3,649,642
GREEN PIGMENT DYES OF THE PHTHALO-
CYANINE SERIES

Arnold Tartter, Lambsheim, Pfalz, and Enno Luebcke and Horst Belde, Ludwigshafen (Rhine), Germany, assignors to Badische Anilin- & Soda-Fabrik Aktiengesellschaft, Ludwigshafen (Rhine), Germany
No Drawing. Filed Feb. 2, 1968, Ser. No. 702,521
Claims priority, application Germany, Feb. 4, 1967,
P 15 69 665.8, P 16 69 680.3
Int. Cl. C09b 47/04
U.S. Cl. 260—314.5      2 Claims

ABSTRACT OF THE DISCLOSURE

Valuable green pigment dyes are obtained when phthalocyanines containing phenyl groups are treated at temperatures above 20° C. with sulfuric acid having a concentration of more than 50% by weight until the reaction product has a sulfur content of 0.1 to 3.5% by weight.

---

Dyeing organic plastics with phthalocyanines has been known for many years. Metal-free phthalocyanines, cupriferous phthalocyanines or their halogenated derivatives have industrial importance because of their good fastness properties.

In the mass coloration of polyamides with phthalocyanine dyes in green shades, however, difficulties are encountered. Thus halogenated phthalocyanines are attacked in the polyamide melt with reductive removal of halogen with a consequent displacement of shade. If an attempt be made to obviate this disadvantage by using mixtures of blue copper phthalocyanine free from halogen with cadmium yellow, green polyamide dyeings are obtained which have poor fastness to weathering.

There is therefore a demand for pigments suitable for dyeing polyamides green in the use of which the said disadvantage does not occur but pure green shades having great constancy of shade and high fastness properties are obtained.

We have now found that green pigment dyes having the desired properties are obtained when tetraphenyl copper phthalocyanine is treated at temperatures of from 20° to 100° C. with sulfuric acid having a concentration of more than 50% by weight until the reaction product has a sulfur content of 0.1 to 3.5% by weight.

Tetraphenyl copper phthalocyanine, which itself is without industrial interest as a pigment and which for example dyes polyamides in cloudy shades is treated at from 20° to 100° C. with sulfuric acid having a concentration of more than 50% by weight, for example with a 78.4 to 95.6% by weight sulfuric acid, such as is obtained by mixing 0.25 to 1.25 moles of water with 1 mole of sulfuric acid monohydrate. An 85 to 92% by weight sulfuric acid is particularly advantageous.

The sulfuric acid treatment is advantageously carried out by stirring the starting substance into about five to thirty times the weight (with reference to the starting substance) of sulfuric acid of the abovementioned concentration. The duration of the treatment may be about three to about fifty hours. The duration of the treatment should be longer or the treatment temperature should be higher the lower the acid concentration is and the smaller the amount of acid is in relation to the starting substance. Suitable conditions may easily be determined by preliminary experiment, the end point of the treatment being easy to determine by determining the sulfur content of the reaction product. The sulfur content is 0.1 to 3.5%, preferably 0.5 to 2%, by weight.

The new dyes are precipitated in finely divided form from the reaction mixture for example by adding water and are isolated in conventional manner by filtration. Any more strongly sulfonated constituents may if desired be removed by washing the residue with water or weakly alkaline aqueous solution.

The dyes thus obtainable are outstandingly suitable for mass coloration of nitrogenous organic plastics, such as polyamides and urea-formaldehyde condensates and melamine-formaldehyde condensates. These plastics are mass colored by conventional methods, for example by incorporating the finely divided dye into the said materials, for example by grinding, stirring, kneading or melting, for example in mills, kneaders or extruders. Dope dyeing is also possible such as dyeing polymers by carrying out the polymerization to the plastics in the presence of the dye. Phthalocyanines containing partly sulfonated phenyl groups may be used either direct or in the form of their salts, i.e. after the free sulfonic acid groups have been converted into the corresponding salt groups. The salts may be prepared by known methods, for example by reaction with compounds containing alkaline earth metal ions or heavy metal ions, such as the acetates or chlorides of calcium, magnesium or zinc, or with amines, such as ammonia, cyclohexylamine, 2-ethylhexylamine, 2 - ethylhexyloxypropylamine or oleylamine or their salts.

The mass colored plastics obtainable by the use of the dyes are distinguished by their pure green shades, their great color strength and constancy of shade and by very good fastness properties, particularly very good resistance to heat setting and high light fastness and weather fastness.

The invention is further illustrated by the following examples in which parts and percentages are by weight.

EXAMPLE 1

175 parts of a powdered crude tetraphenyl copper phthalocyanine (which has been prepared by baking 4-phenylphthalic acid, urea and a copper salt with ammonium molybdate as catalyst and which has been boiled up with hydrochloric acid) is introduced in the course of twenty-five minutes while stirring into 2100 parts of 90.6% sulfuric acid. The temperature is raised to 65° C. and kept at 65° to 66° C. for six and a half hours, and then cooled. The reaction material is stirred into 18,000 parts of water at 90° C. The suspension is kept at 90° to 95° C. for thirty minutes. The product is then suction filtered while hot and washed with hot water. The moist filter cake is made into a paste with 3000 parts of water at 70° C., neutralized with 10% aqueous ammonia, suction filtered again and dried at 75° C. under subatmospheric pressure, followed by grinding. A green pigment powder is obtained having a sulfur content of 1.09%.

EXAMPLE 2

100 parts of tetraphenyl copper phthalocyanine of the quality of the material used in Example 1 is introduced with stirring into 500 parts of an about 90% sulfuric acid. The whole is then heated to 85° C. The mixture, which gradually becomes thicker and more viscous, is stirred for about seven hours at 85° C., diluted with 500 parts of 90% sulfuric acid and introduced into hot water. The product is suction filtered and washed with hot water and the filter cake is made intensely into a paste, suction filtered again and dried.

A green dye is obtained having a sulfur content of 0.7% which is substantially in the form of particles having a size of from about 0.2 to 0.5 micron.

EXAMPLE 3

2500 parts of crude desalted and ground tetraphenyl copper phthalocyanine is stirred into 20,000 parts of 89% sulfuric acid for five to six hours at 82° to 83° C. When the reaction mixture, without additional cooling, has reached a temperature of 25° to 30° C. it is allowed, with or without previous dilution with 89% sulfuric acid, to flow with rapid stirring into 150,000 parts of water at a temperature of 90° C. A temperature of about 95° C. is maintained for one hour and the product is suction filtered while hot and washed with hot water.

The filter cake, while still wet, is stirred into 20,000 parts of hot condensed water, neutralized with aqueous ammonia and suction filtered, dried and ground. A green dye powder is obtained which in linseed oil varnish has a yellowish green shade and contains 0.93% of sulfur.

EXAMPLE 4

A suspension of 75 parts of a crude tetraphenyl copper phthalocyanine prepared by the urea melt method in 1000 parts of 85% sulfuric acid is stirred for forty hours at 75° to 80° C. and then poured out into 8000 parts of water at 80° C. After heating for fifteen minutes at 90° to 95° C., the pigment is suction filtered while hot, washed with hot water and then with 0.5% aqueous ammonia and finished off in the conventional manner. A microcrystalline green dye is obtained having a sulfur content of 1.0%.

EXAMPLE 5

60 parts of a crude tetraphenyl copper phthalocyanine which has been boiled up with hydrochloric acid and with caustic soda solution (which has been prepared from phenylphthalic anhydride, urea and copper chloride in the presence of catalytic amounts of molybdic acid in trichlorobenzene) is stirred in 720 parts of 90% sulfuric acid for ten hours at 50° C. and for seven hours at 65° to 66° C. and then allowed to cool. The acid swollen product is introduced into 5000 parts of hot water, allowed to stand for about an hour and suction filtered while hot. While still wet, the filter cake is washed neutral with hot water, covered with a solution of 10 parts of calcium acetate or calcium chloride in 1000 parts of water or stirred with this solution. The product is suction filtered and finally washed with water. The dried green dye contains 1.13% of sulfur and 0.6% of calcium.

Magnesium acetate or zinc acetate for example may be used instead of calcium acetate.

When 1 part of tetraphenyl copper phthalocyanine is treated with 10 parts of 92.5% sulfuric acid for six hours at 55° C. or with 18 parts of 96% sulfuric acid for three hours at 25° to 30° C., green pigments are obtained which have an even more yellowish tinge and a sulfur content of 1.7% or 2.5%.

EXAMPLE 6

100 parts of a urea-formaldehyde condensate molding material and 0.5 part of the dye prepared according to Example 1 are ground for one hour in a ball mill. The material is then molded under pressure at 170° C. in the conventional manner. Green moldings are obtained which, as compared with moldings prepared in an analogous way with hexadecachloro copper phthalocyanine, have a light fastness which is better by 2 to 3 notes, and do not darken.

EXAMPLE 7

0.5 part of the dye prepared according to Example 4 is mixed in a drum mixer with 99.5 parts of polyamide granulate. The granulate coated with pigment is then melted under nitrogen at about 260° to 290° C. and then spun in the conventional manner. Polyamide filaments or threads which are dyed uniformly green are obtained which have very good textile fastness properties, particularly high light fastness and water fastness.

EXAMPLE 8

1 part of titanium dioxide, 0.5 part of the dye prepared according to Example 3 and 98.5 parts of a urea formaldehyde resin are ground in a ball mill. The mixture is heated to 175° C. and formed by pressure into moldings. The moldings do not change their green shade upon exposure to light and weathering, whereas press moldings which have been prepared in an analogous way using 0.5 part of a hexadecahalogen copper phthalocyanine as dye darken under the same treatment and their shade shifts towards blue green.

Similar moldings are obtained by using a melamine-formaldehyde condensate instead of a urea-formaldehyde condensate.

EXAMPLE 9

1 part of the dye prepared according to Example 4 (in the form of the calcium salt) having a sulfur content of 1.07% is stirred into 99 parts of molten caprolactam. The product is spun after having been polymerized in the conventional manner. A material is obtained which has been dyed light fast and which has a substantially purer green shade than a material obtained in an analogous manner using the sulfur-free tetraphenyl copper phthalocyanine prepared according to the process of Swiss patent specification No. 224,649.

We claim:

1. A process for the production of a green pigment dye of the phthalocyanine series containing only partly sulfonated phenyl groups which comprises reacting tetraphenyl copper phthalocyanine at a temperature of from 20° C. to 100° C. with sulfuric acid having a concentration of more than 50% by weight until the reaction product has a sulfur content of from 0.1 to 3.5% by weight, terminating the reaction and isolating the reaction product having said sulfur content.

2. A process as claimed in claim 1 wherein the sulfuric acid has a concentration of 85 to 92% by weight.

References Cited

UNITED STATES PATENTS

| 2,280,507 | 9/1942 | Bienert et al. | 260—314.5 |
| 2,213,517 | 7/1940 | Bienert et al. | 260—314.5 |

HENRY R. JILES, Primary Examiner

H. I. MOATZ, Assistant Examiner

U.S. Cl. X.R.

8—1 XA, 162 R, 178 R; 260—37 N, 39